(12) United States Patent
Earle

(10) Patent No.: US 7,208,894 B1
(45) Date of Patent: Apr. 24, 2007

(54) ELECTRIC VEHICLE MOTOR AND CONTROL SYSTEM WITH HIGH EFFICIENCY REGENERATION

(76) Inventor: John L. Earle, P.O. Box 133, Sweet Home, OR (US) 97386

( * ) Notice: Subject to any disclaimer, the term of this patent is extended or adjusted under 35 U.S.C. 154(b) by 0 days.

(21) Appl. No.: 11/264,430

(22) Filed: Nov. 1, 2005

(51) Int. Cl.
*H02P 5/00* (2006.01)

(52) U.S. Cl. ............... 318/105; 318/404; 180/65.3; 180/65.4; 180/65.5; 307/48; 307/63; 307/66

(58) Field of Classification Search ............. 318/105, 318/404; 180/65.3–65.5; 307/48, 63, 66
See application file for complete search history.

(56) References Cited

U.S. PATENT DOCUMENTS

| | | | | |
|---|---|---|---|---|
| 4,010,407 A | * | 3/1977 | Lombard | 318/63 |
| 4,103,211 A | * | 7/1978 | Gardner et al. | 318/87 |
| 4,199,037 A | * | 4/1980 | White | 180/65.4 |
| 4,270,622 A | * | 6/1981 | Travis | 180/65.4 |
| 5,661,354 A | | 8/1997 | Burtis | 310/113 |
| 6,028,403 A | | 2/2000 | Fukatsu | 318/88 |
| 6,028,404 A | | 2/2000 | Yang | 318/111 |
| 6,082,476 A | * | 7/2000 | Stulbach | 180/65.3 |
| 6,105,696 A | | 8/2000 | Chen | 180/65.1 |
| 6,140,799 A | * | 10/2000 | Thomasson | 320/117 |
| 6,404,151 B1 | | 6/2002 | Bader | 318/39 |
| 6,630,764 B1 | | 10/2003 | Dube et al. | 310/177 |
| 6,686,719 B2 | | 2/2004 | Cochoy et al. | 318/801 |
| 6,744,164 B2 | | 6/2004 | Kadoya et al. | 310/114 |
| 6,849,984 B2 | | 2/2005 | Gallant | 310/178 |
| 6,888,280 B2 | | 5/2005 | Dube et al. | 310/177 |
| 6,909,215 B2 | * | 6/2005 | Bryant | 310/114 |
| 2005/0067199 A1 | | 3/2005 | Shimizer | 180/65.1 |

* cited by examiner

*Primary Examiner*—Rita Leykin
(74) *Attorney, Agent, or Firm*—James Creighton Wray

(57) ABSTRACT

The present invention is an electric vehicle power system that uses multiple permanent magnet motor/generators connected in series or parallel and multiple battery step switching. Motor, torque and speed are controlled by steps in series connection and then in parallel connection. Smooth acceleration, regeneration and current control are provided by delaying stepping from one battery step to the next until the next step is fully engaged. Transients are limited to the effect of one battery step by using rectifier shunt switching. Multiple motors provide acceleration torque at low speed in series connections and at cruising speeds in parallel connection. Regenerative deceleration is provided in the opposite manner. Battery depletion is averaged by flipping ends of a battery bank. Controls are provided with normal foot controls and a speed setter. A separate deceleration pedal or lever may be used.

33 Claims, 10 Drawing Sheets

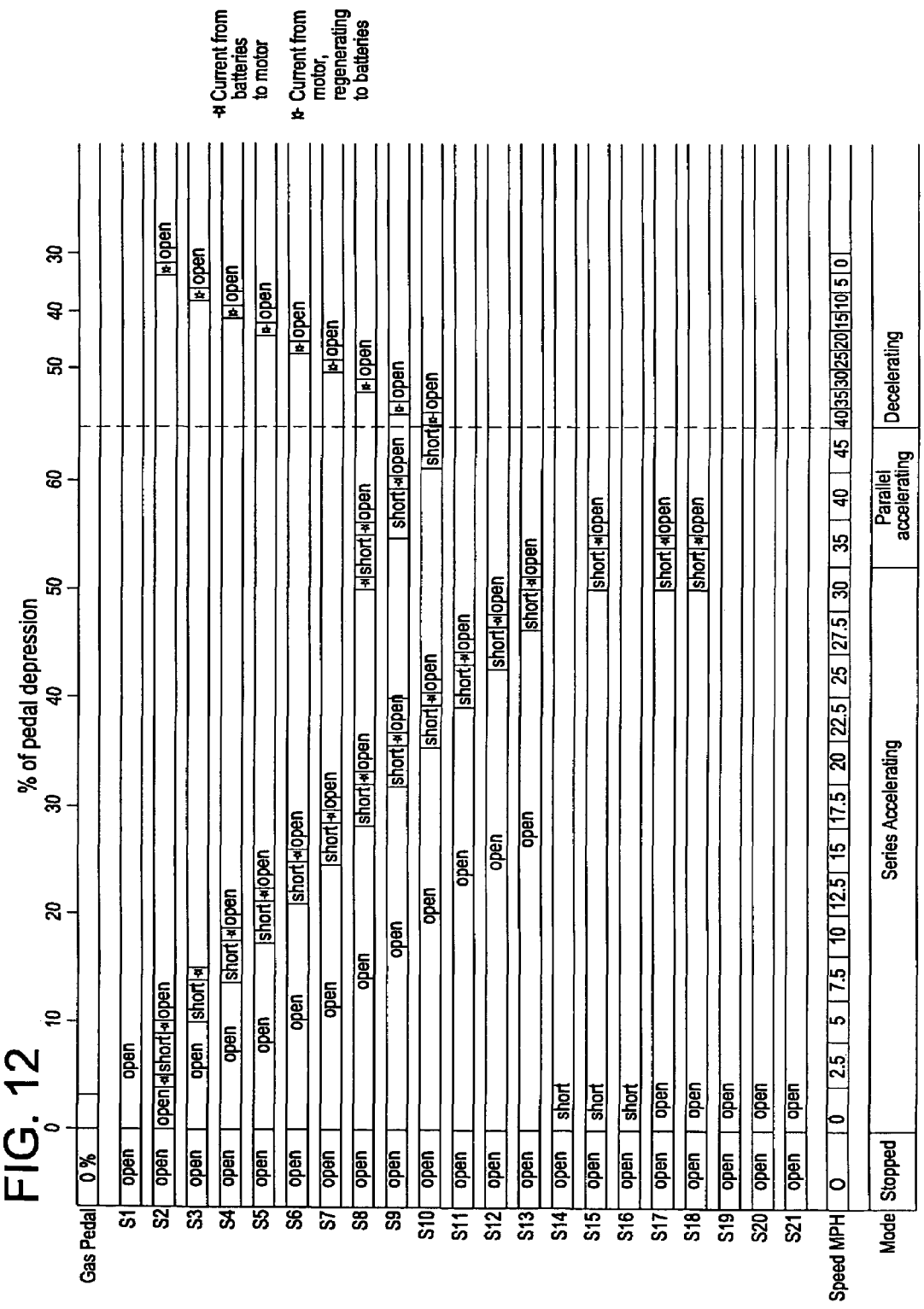

ELECTRIC VEHICLE MOTOR AND CONTROL SYSTEM WITH HIGH EFFICIENCY REGENERATION

BACKGROUND OF THE INVENTION

Electric vehicles have received limited acceptance among the general public in the United States.

Two types of motors are most used for electric vehicles. These types include series wound D.C. motors, and A.C. induction motors.

A series wound motor has good high starting torque characteristics, and is most commonly controlled by a variable duty cycle, high frequency chopping system. However, the series wound motor is a poor generator with no regeneration, unless the field coil is split from the series connection and changed to a parallel or shunt motor equivalent. Even then, the field consumes battery power, and there is no net regeneration power unless high rotational speeds can be maintained long enough to create a net benefit. Additionally, the duty cycle motor speed controller is not used for regeneration. A separate regeneration controller is needed for a series motor to gain any small possible regeneration power during deceleration. Since that is not practical, it is rarely attempted with a series motor. Another drawback is radio frequency emissions (emi) from the chopper controller.

An A.C. induction motor is used in complex systems. That motor also has limited regeneration and limited efficiency, and it requires a variable D.C. to A.C. converter to function.

Needs exist for improved propulsion and control systems that make electric vehicles more efficient and practical.

SUMMARY OF THE INVENTION

An electric vehicle of the present invention has a control system that uses multiple battery step switching of batteries in a series battery bank. Regeneration and current control are provided by delaying stepping from one step to the next until the next step causes current to flow. When the next step is fully engaged the previous step is shut off by opening a circuit to its rectifier. Transients are limited to the effect of just one battery step by using rectifier shunt switching. Multiple motors provide increased low speed acceleration torque in series connection and further acceleration and cruising speeds in parallel connection. Battery depletion is averaged out by flipping ends of a battery bank, along with appropriate steps. The present invention improves propulsion and control systems and makes electric vehicles more efficient and practical.

The present invention uses lightweight, pancake style, permanent magnet motors as the most efficient and the best for regeneration. That motor uses no field winding power and functions well as a generator, providing nearly as much voltage as a generator as it consumes functioning as a motor at the same rotational speed. Until recently, powerful, lightweight permanent magnet motors were not available in sizes large enough for an automobile. The present invention uses two or more permanent magnet motors. The two or more motors are ganged together on a drive shaft or are used in pairs for each driven wheel. Because torque is a function of current, connecting the motors in series provides multiplied torque for acceleration at low speeds, as the same current flows through each motor. As speed is increased, the motors are switched to parallel for maximum speed.

The control system of the present invention uses an improved step method, instead of a variable duty cycle chopper. In a preferred embodiment, a series of twelve six-volt batteries provide six-volt steps from six to seventy-two volts. Single cell taps are provided in top and bottom batteries for single cell (2 volt) resolution. The motor speed is dependent upon applied voltage, making it controllable by battery step voltage.

A step controller is used to switch into the appropriate battery tap voltage with multiple contactors and relays. One problem is the lack of smooth control as one step is switched off and the next step is switched on. Another problem is large transients as the motor is switched off before the next higher voltage step is switched on as the vehicle is accelerating.

The present invention reduces both of those drawbacks. The invention also gains more steps by using multiple motors that are switched from series to parallel. By using shunted rectifier controls between steps, full voltage transients are reduced to just the transient from one battery step change, for example, six volts in a typical case with six volt batteries. A processor controlled variable resistor controls single battery cell steps to provide near vernier speed control between steps. The variable resistor can provide heating and defrosting functions as well. The variable resistor may be replaced with a DC to DC converter operating from zero to six volts and outputting full battery recharging voltage for lower loss than the variable resistor.

With controlled shunt rectifier switching, the previous step voltage is maintained until the next step causes current to flow and the previous step is shut off by the rectifier, which is then engaged. Once engaged, the rectifiers of the next step are shunted out for maximum possible efficiency until current limits or speed control calls for a step change. At that time, a protocol opens the appropriate rectifier shunt and the transition to the next step reduces to one battery step in voltage.

Regeneration follows a similar pattern during deceleration. Appropriate rectifiers provide current direction into the batteries.

Another problem with simple battery step switching is the lack of full battery utilization if anything less than full speed is selected. Generally, the upper most batteries in the series may seldom or never get used, or at least are not used as often as the lower series batteries. The present invention counteracts unequal use of batteries by periodically interchanging the ends of the battery series. During the interchanging, polarity is flipped through switching so that speed change is imperceptible during battery load reassignment.

Processors activate appropriate switches according to a foot pedal or other speed selector mechanism position in the case of an automobile. Since inertia of the vehicle is a component of the dynamics of the system, control is implemented in a variety of ways while sensing speed, current and the operator's desires via the foot pedal position.

In one preferred embodiment, speed is related to foot pedal position. When the pedal is released and brought back to the no motion position, regeneration quickly slows the vehicle.

In another preferred embodiment, coasting is allowed if the pedal is released. Regeneration is activated by a separate action, such as a pressure sensor on a brake pedal that causes regeneration to take place before the hydraulic brake system operates.

In another preferred embodiment, a separate pedal is used for regeneration. For example, a regeneration pedal may replace a traditional clutch pedal.

The present invention includes electric vehicle motors and control systems. One or more sets of wheels are connected by a drive shaft to two or more permanent magnet motor/regenerators ganged together. The motors are powered in series or parallel. Two or more batteries are connected in series. Shunted rectifier controls between batteries provide battery step control which reduces transients of switching by maintaining power from the previous battery until current starts to flow to the motors from the next battery and switch. A variable resistor and current sensor controls switching off for speed control between steps. The two or more motors are connected in series for increased torque at low speeds and are switched to a parallel configuration for maximum speed as speed increases.

Each set of driven wheels uses two or more permanent magnet motors grouped together. The battery step method control unit reduces transients to only one battery voltage value. The battery step method control unit is controlled by logic or a processor that monitors current and limits current according to set points dependent on operator input.

Regeneration is performed by the same battery step method control unit for reducing transients of switching. Top and bottom series switching is used for equalizing battery drain.

Operator input is supplied by foot pedals or variable elements. A speed sensor is used for determining regeneration intensity or current. Regeneration intensity or current is determined by pressure on brake pedal prior to hydraulic brake actuation. Alternatively, another pedal is used for controlling regeneration level or current by a separate operator action on the pedal.

The present invention provides an electric vehicle motor and control method. The method starts with providing two or more permanent magnet motor/generators connected together.

These and further and other objects and features of the invention are apparent in the disclosure, which includes the above and ongoing written specification, with the drawings.

BRIEF DESCRIPTION OF THE DRAWINGS

In FIG. 9 rectifiers for switching the motors from series to parallel and for applying 42V are engaged.

FIG. 12 is a graph of example acceleration and deceleration sequences.

Figure 13:
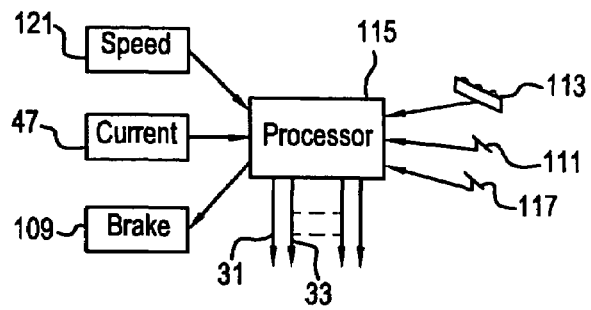

Control of the switches is schematically indicated in FIG. 13.

DETAILED DESCRIPTION OF THE PREFERRED EMBODIMENTS

Figure 1:
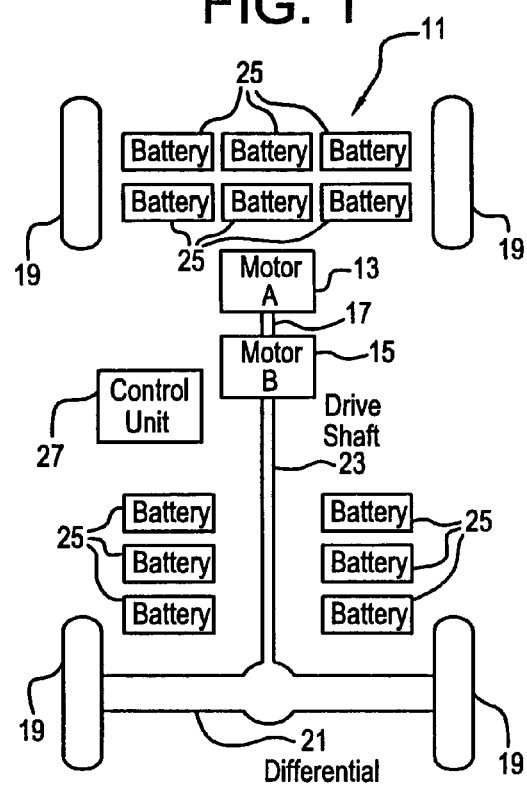
FIG. 1 is a schematic representation of a configuration of an automobile with multiple motor/generators that are mechanically coupled together.

FIG. 1 is a schematic of a configuration of an automobile 11 with multiple motors 13, 15 that are mechanically coupled 17 together. Wheels 19 of the automobile 11 are connected by a differential 21 connected to the motors 13, 15 by a drive shaft 23. Multiple batteries 25 are located within the automobile 11. A control unit 27 controls the motors 13, 15.

Figure 2:
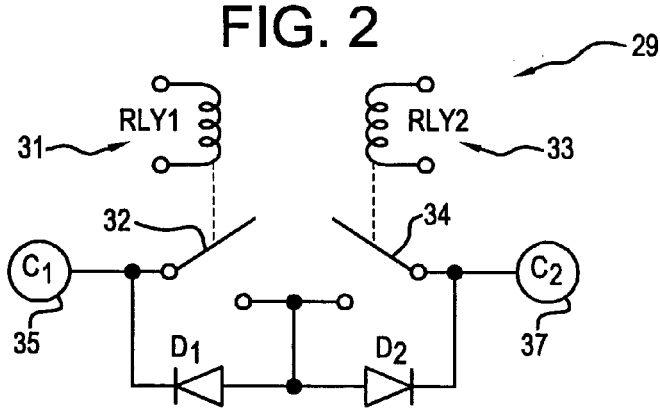
FIG. 2 is a schematic representation of switch back to back with rectifiers and relays and controls shunt switching. An electromechanically switched system has relays for closing and opening the contactors, shunting one switch and engaging one of the rectifiers.

FIG. 2 is a schematic representation of back-to-back rectifiers 29 with shunt switching. A mechanically or electromechanically switched system has relays 31, 33 and contactors 32, 34. The rectifiers directionally control current between switched points 35, 37 in the power line. Four switching modes are provided. The first is an open circuit when neither relay is energized and both contactors are open. The second is a short circuit when both relays are energized and both contactors are closed. The third is conduction through rectifier $D_2$ passing current to the right, with relay 31 energized and contactor 32 closed. The fourth is conduction through rectifier $D_1$ passing current to the left, with relay 33 energized and contactor 34 closed.

In a preferred embodiment, illustrated in the following Figures, a series of twelve six-volt batteries provide six-volt steps from six to seventy-two volts. Operationally, the switching is initially an open circuit. Acceleration starts by closing both relays, which passes current with no rectifier voltage drop from battery step 1, approximately +6 volts. Just before switching to the next step up in voltage, relay 33 opens so that the majority of battery current from step 1 continues to flow while battery in step 2 energizes relay 33 in switch $S_3$ inserting a rectifier $D_2$ from the second battery $B_2$ in step 2, allowing the battery in step 2 to take over and shutting off current flow from the battery in step 1. FIGS. 4–11 illustrate an actual example of switching sequences. Deceleration and regeneration follows a similar rectifier-short-rectifier protocol.

Figure 3:
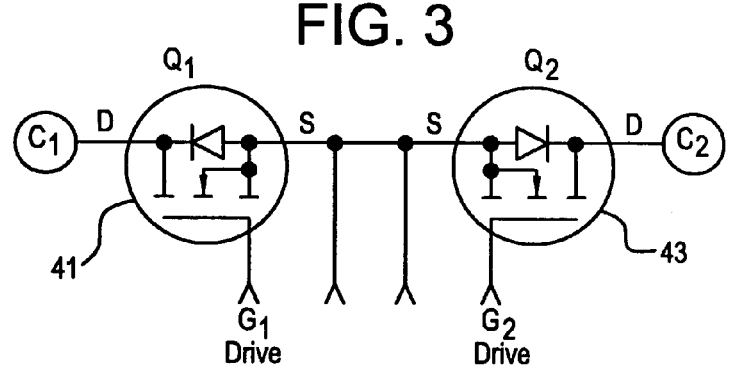
FIG. 3 is a schematic representation of an N-type MOSFET equivalent switcher.

FIG. 3 is a schematic of an N-type MOSFET equivalent switcher. FIG. 3 shows solid state rectifier shunt switching 39 with MOSFET power transistors 41, 43. The MOSFET power transistors 41, 43 already contain reverse flow rectifiers, providing the four modes of operation with only two MOSFET transistors. Note that the "ON" resistance of the MOSFET is ohmic for low voltages of either polarity. This effectively shunts the internal rectifier when the transistor is turned "ON". Thus, the MOSFET embodiment of the present invention approaches a relay or contactor switch efficiency while providing solid state reliability.

Figure 4:
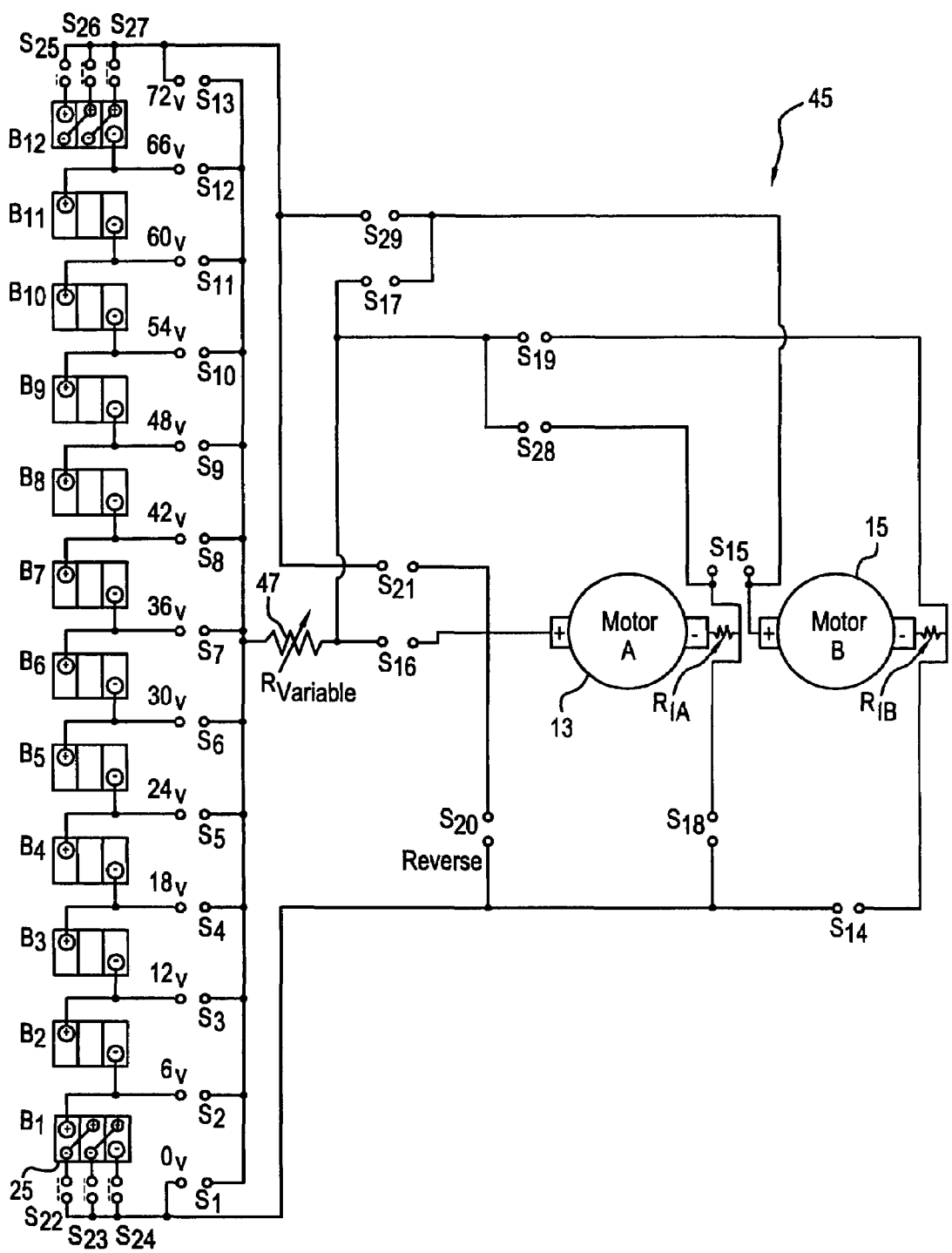
FIG. 4 is a schematic representation of a battery and motor/generator control circuit with all switches open.

FIGS. 4–11 illustrate examples of switching sequences. FIG. 4 is a schematic of an open circuit 45 with all switches open. Switches $S_1$ to $S_{13}$ are connected to the batteries $B_1$ to $B_{12}$ for selecting battery bank voltage from 0 to 72 volts. Switch $S_{15}$ connects the motors in series. Opening $S_{15}$ and closing switches $S_{17}$, $S_{16}$ and $S_{18}$, $S_{14}$ connects the motors in parallel. Switch $S_{14}$ connects the negative terminal of battery $B_1$ to the motors. Switch $S_{16}$ connects the positive terminal of the selected battery $B_1$–$B_{12}$ to provide the selected 6–72V voltage to the motors for driving the motors and the vehicle in a forward direction and to provide regeneration to those selected batteries. To operate using the upper batteries in the bank, switch $S_{21}$ connects the positive terminal of battery $B_{12}$ to the motors and switches $S_2$–$S_{13}$ connect the negative terminal of a selected battery to switch $S_{19}$, which connects the negative terminal of the selected battery $B_{12}$ through $B_1$ to the motors to drive the motors forward and to provide regeneration to the batteries from the top of the battery bank. The system includes a variable resistor 47 set to zero ohms (shorted) when no Vernier speed adjustment is needed. Current sensing resistive elements are in series with each motor. Each battery in series adds an additional approximately 6 volts to the system. The variable resistor 47 can be processor controlled to control speed in a Vernier fashion between absolute battery voltage steps. Taps may be used for each cell for smaller battery steps. At least one such tapped battery may be in the active battery string. Variable resistor 47 can be an inverter or DC to DC converter for accepting zero to six volts and outputting a small regeneration current into the entire battery string.

Figure 5:
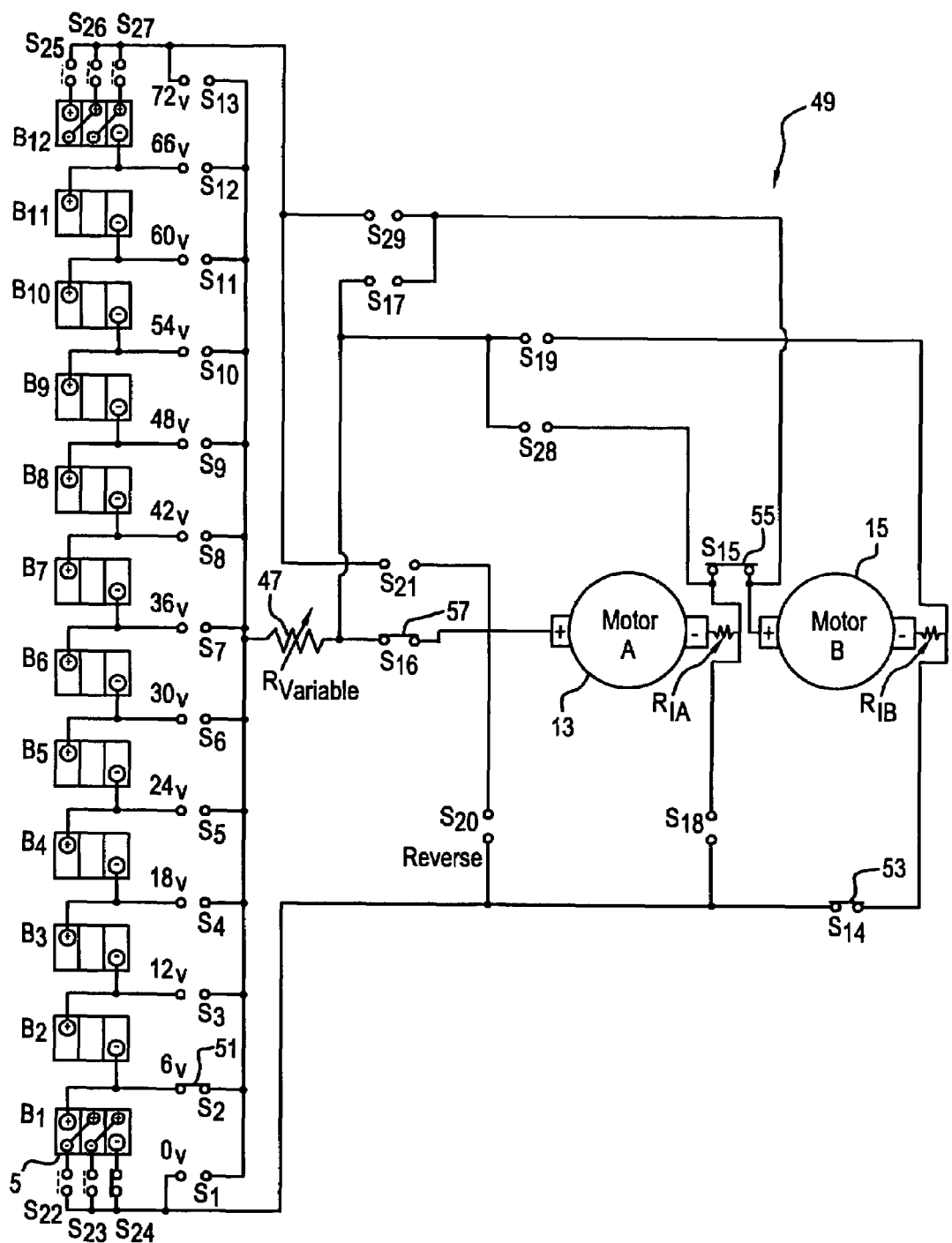
FIG. 5 is a schematic representation of the circuit with switches closed for forward operation and switches closed to connect the motors in series. Acceleration begins upon closing, shunting or shorting a switch from a first battery.

FIG. 5 is a schematic of a circuit 49 with acceleration that begins with shorted switch $S_2$. Switches $S_{14}$, $S_{15}$, $S_{16}$ and $S_{24}$ are also closed. $S_{22}$, $S_{23}$ or $S_{24}$ may be alternately selected for Vernier speed control with single cell steps. The variable resistance current sensing element 47 is set to zero ohms and shorted. Switches $S_2$ to $S_{13}$ are connected to the batteries to control the numbers of batteries in use. Switch $S_{15}$ is shorted 55 to connect motors A and B 13, 15 in series. Switches $S_{14}$ and $S_{16}$ are closed to run the motors and the vehicle in a forward direction using the lower batteries in the bank. Switch $S_2$ is closed to begin acceleration by applying 6 volts to the motors.

Figure 6:
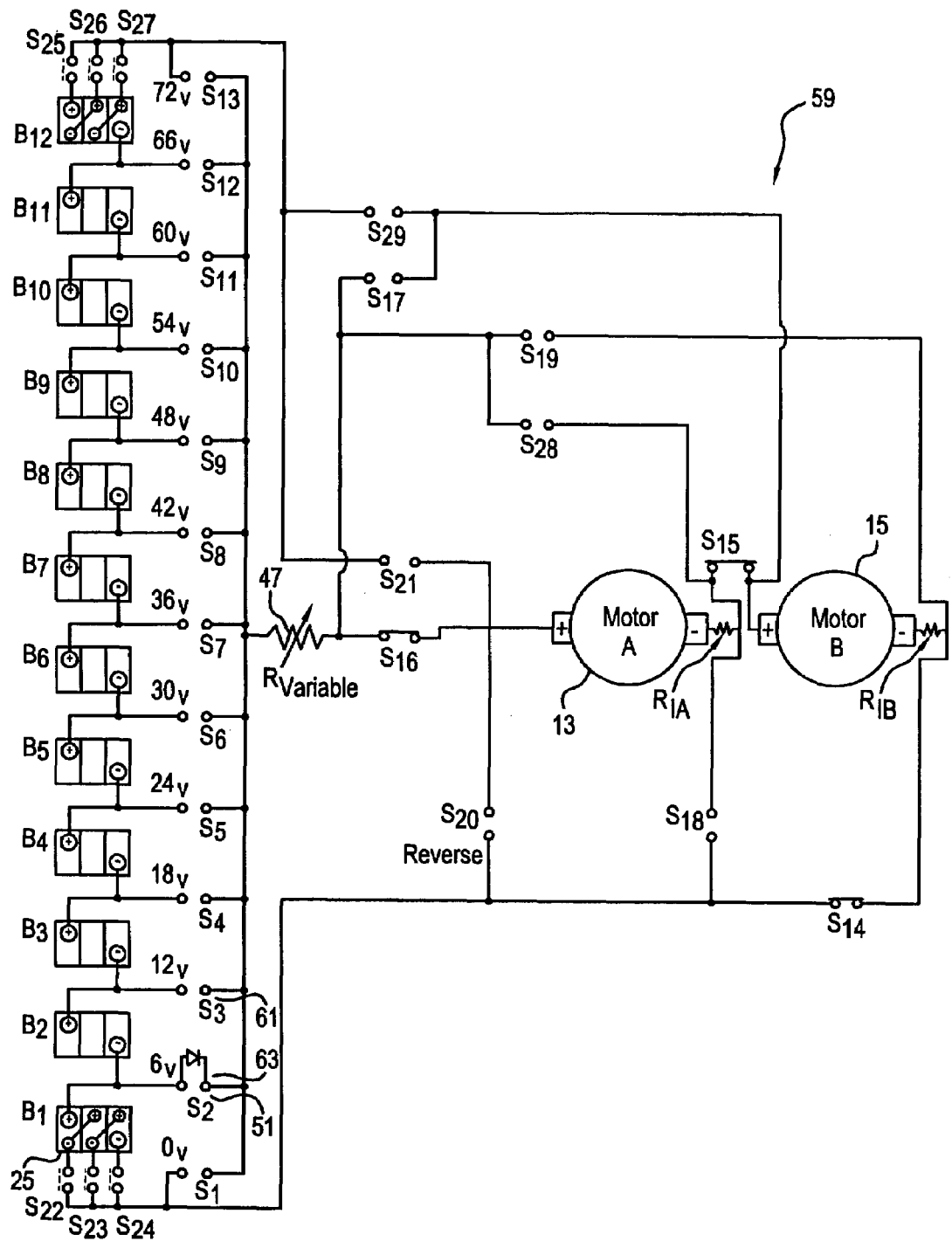
FIG. 6 is a schematic representation of the circuit prepared for acceleration preparing for the next step with current continuing through a rectifier from the first battery.

FIG. 6 is a schematic of a circuit 59 under acceleration, preparing for closing 61 of switch $S_3$ in the next step. Current through 51 $S_2$ continues across rectifier 63. As shown in FIG. 2 the current continues to flow through rectifier $D_2$ when contactor 32 remains in the closed position while contactor 34 is opened. That is what occurs in the preparation step shown in FIG. 6.

Figure 7:
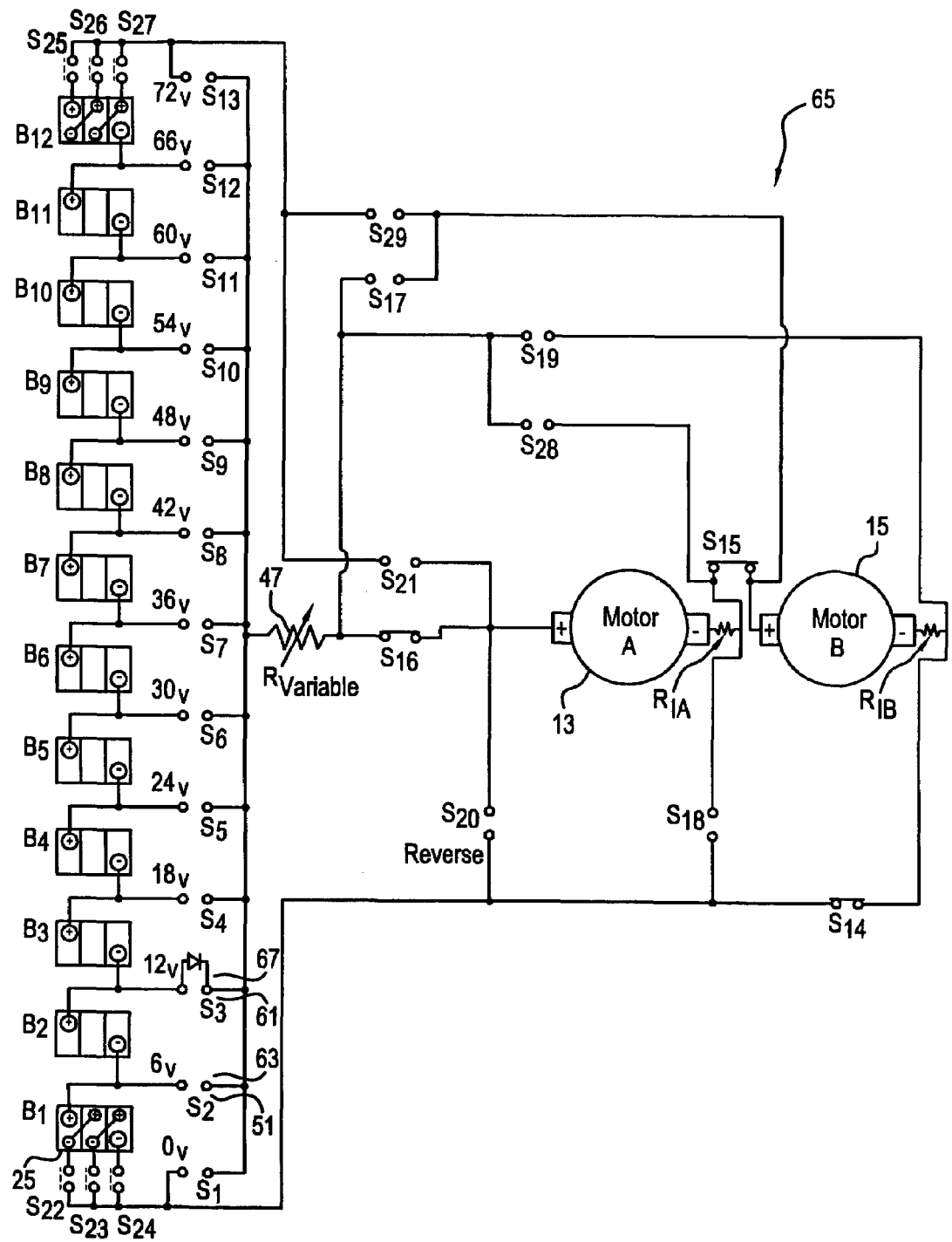
FIG. 7 is a schematic representation of the circuit prepared for acceleration with current flowing through the rectifier in a switch from the second battery shutting off current through the rectifier at the first switch as acceleration continues.

FIG. 7 is a schematic of a circuit 65 showing acceleration with $S_3$ closed by rectifier 67. Current flows through rectifier 67, across the switch $S_3$ and shuts off rectifier 63 at switch $S_2$ as acceleration continues.

The rectifier 63 at switch $S_2$ is further removed by deenergizing relay 31 and opening contactor 32, as shown in FIG. 2.

Figure 8:
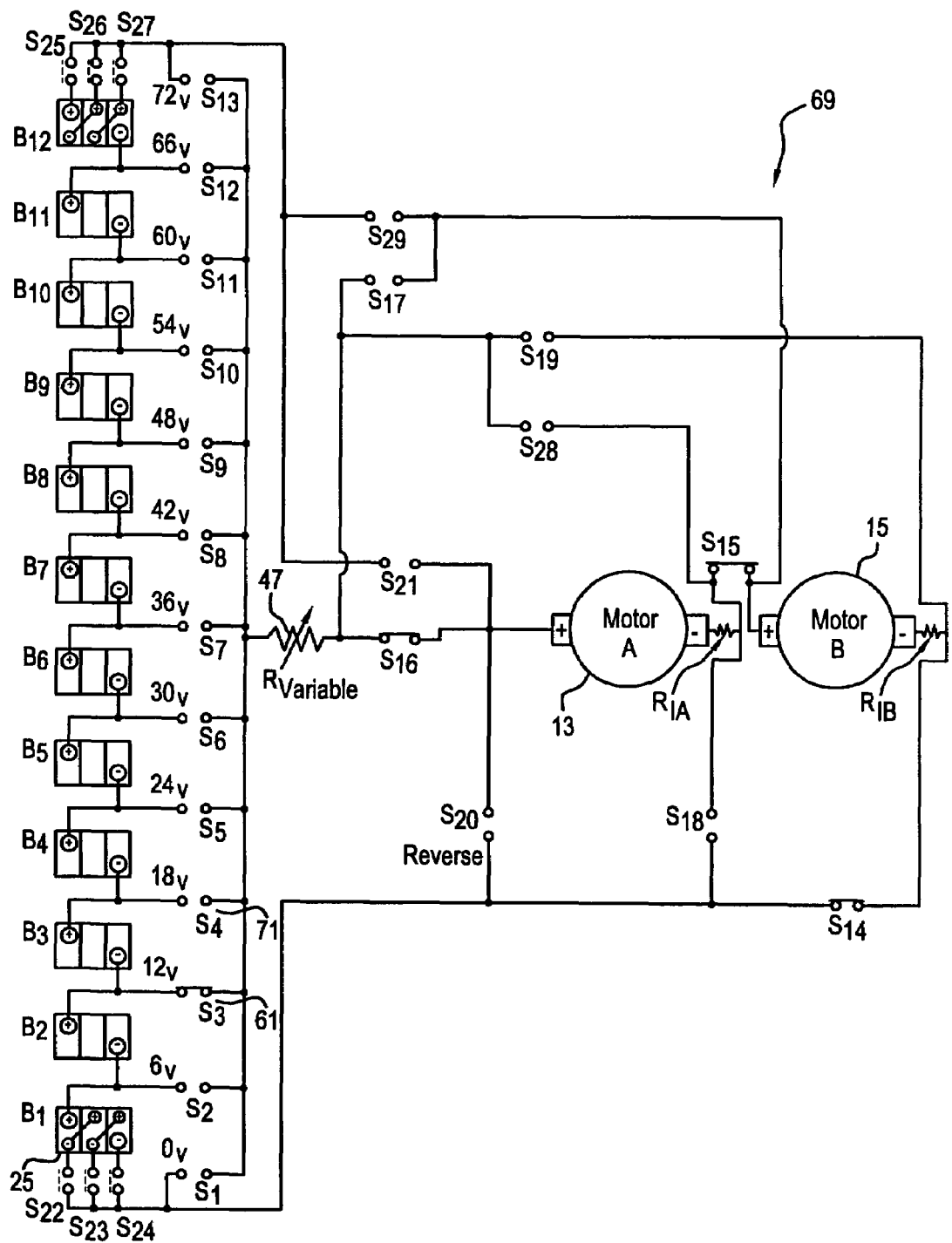
FIG. 8 is a schematic representation of the circuit as acceleration continues with the switch from the second battery. The process of engaging a rectifier and then shorting until motor current switch engaging a rectifier at the next switch shunting the next switch and removing the previous rectifier is repeated through out the stepping.

FIG. 8 is a schematic of a circuit 69 as acceleration continues with switch 61 $S_3$ shorted until enough motor current is sensed in variable resistor current sensor $R_{IA}$ and $R_{IB}$ to enable setup of rectifiers, first for switch $S_3$, then for switch 71 $S_4$ in the same manner as in the previous step protocol shown in FIG. 7. The steps continue as the motors accelerate with sequential setting up of the next forward rectifier, shorting that switch and removing the previous rectifier and repeating the protocol for increasing voltage up to 72V in sequential 6V intervals with switches $S_4$ through $S_{13}$.

Figure 9:
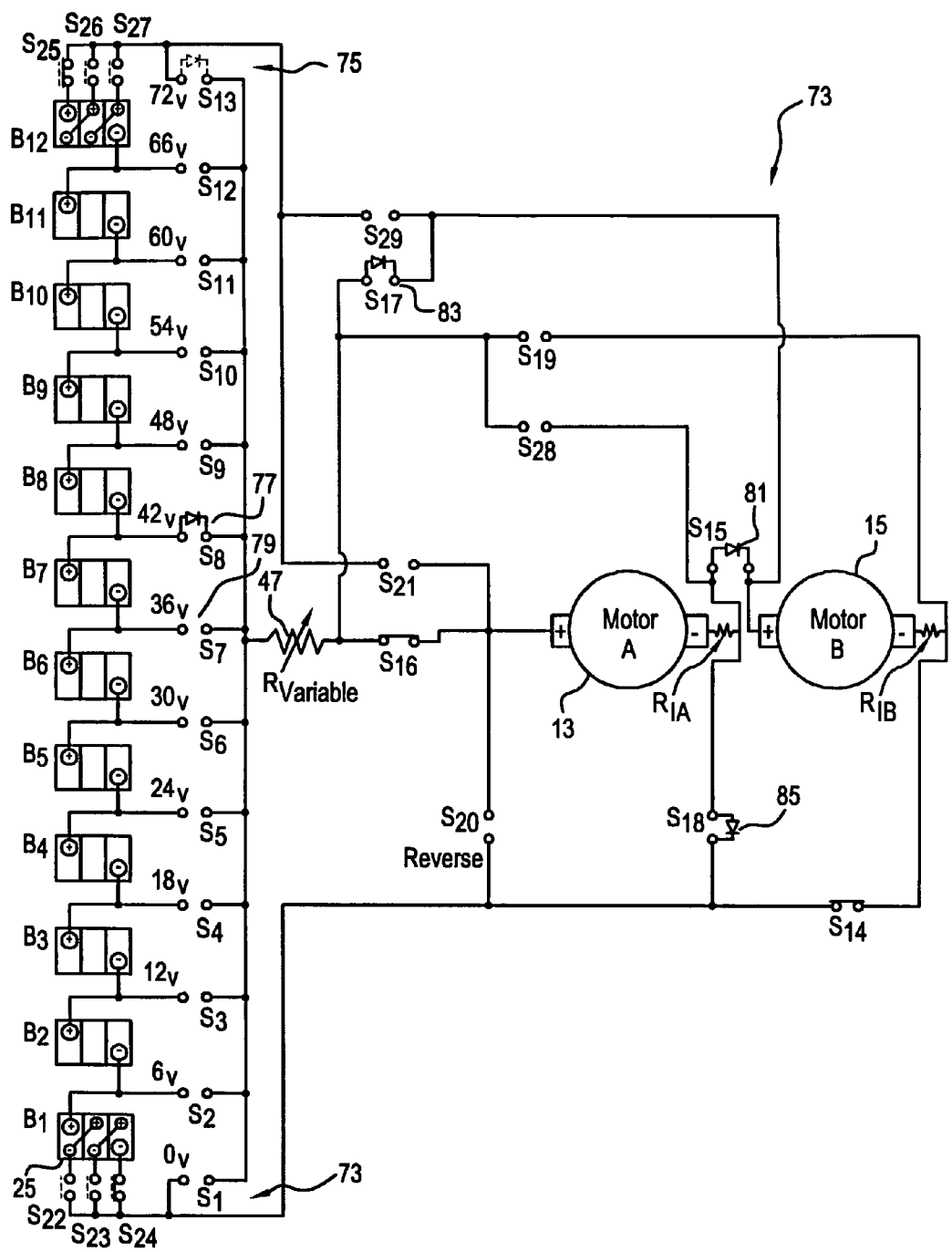
FIG. 9 is a schematic representation of the circuit after successive switches have been shunted and rectifiers have been connected in switches for acceleration with full voltage applied to the series-connected motor/generators.

FIG. 9 is a schematic of a circuit after acceleration with full voltage to approximately 72 volts through switch $S_{13}$ and $S_{25}$, into series connected motors 13, 15, at approximately 30 M.P.H. As shown in FIG. 9 motors 13, 15 are switched to parallel by opening switch $S_{15}$ and closing switches $S_{17}$ and $S_{18}$ smoothly with the aid of rectifiers as schematically shown. Switch $S_{13}$ is opened and switch 77 $S_8$ is closed smoothly with the aid of the rectifiers as shown in FIG. 2, resulting in a step up in voltage to approximately 42 volts, just 6 volts over the 36V voltage drop that each of the motors experienced in series connection. Approximately 36 volts was provided across each series connected motor when switch $S_{13}$ was closed. Rectifiers 81, 83, 85 are used at switches of $S_{15}$, $S_{17}$ and $S_{18}$ during the transition of the motors from series to parallel. Rectifier usage during switching of the motors from series to parallel keeps motor current flowing during the switching, reducing transients.

To extend the life of the batteries, motive or regenerative power is transferred out of or into opposite end portions 73, 75 of the battery bank to cause repeated use of all of the batteries, not just a few. The changing of the ends of the bank requires closing switches $S_{19}$, $S_{28}$, $S_{25}$, $S_{29}$ and $S_{21}$ and the opening of switches $S_{14}$ $S_{18}$, $S_{16}$ and $S_{17}$. Switching ends of the bank occurs by closing and opening the respective switches using the rectifier protocol.

Figure 10:
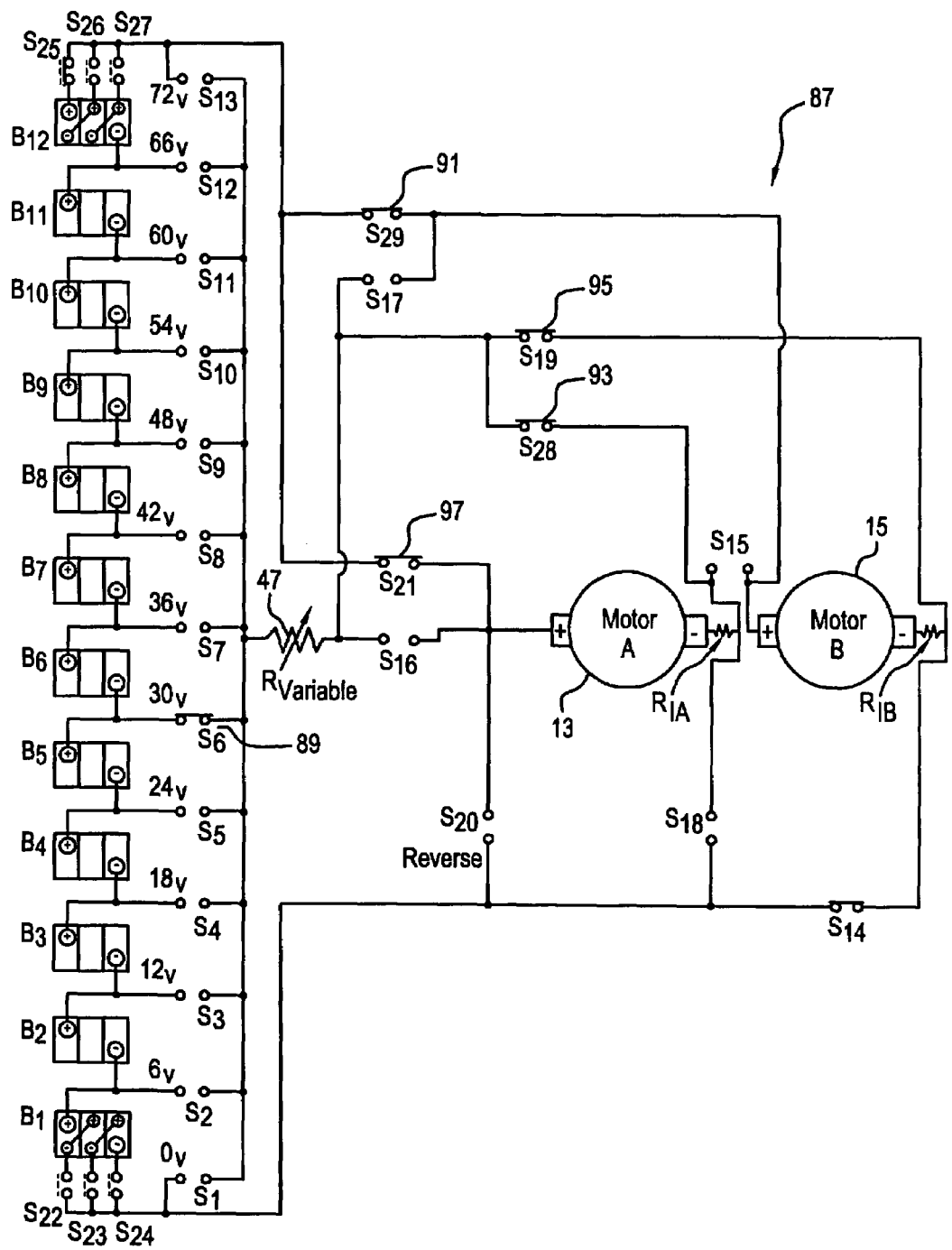
FIG. 10 is a schematic representation of the circuit after battery bank flipping by opening closing switches and closing a switch for maintaining the same applied voltage in parallel to the motors as in FIG. 9, with upper batteries being used instead of the lower batteries to equalize battery loading and life.

FIG. 10 is a schematic of a circuit 87 after battery flipping, maintaining the same approximately 42 volts applied to the motors, with upper batteries $B_{12}$–$B_6$ being used instead of lower batteries $B_1$–$B_7$ as shown in FIG. 9, to equalize battery loading. Shorting of switch at 89 provides 42 V, and shorting of the switches at 91, 93, 95 and 97 provides parallel connection of the motors and use of the upper portion of the battery bank. A protocol of rectifier switching as shown in FIG. 2 may be used, or current first may be reduced to zero by coasting. $S_{25}$, $S_{26}$, and $S_{27}$ are used alternately for Vernier speed control, as were $S_{22}$, $S_{23}$ and $S24$ for the lower bank of batteries.

Figure 11:
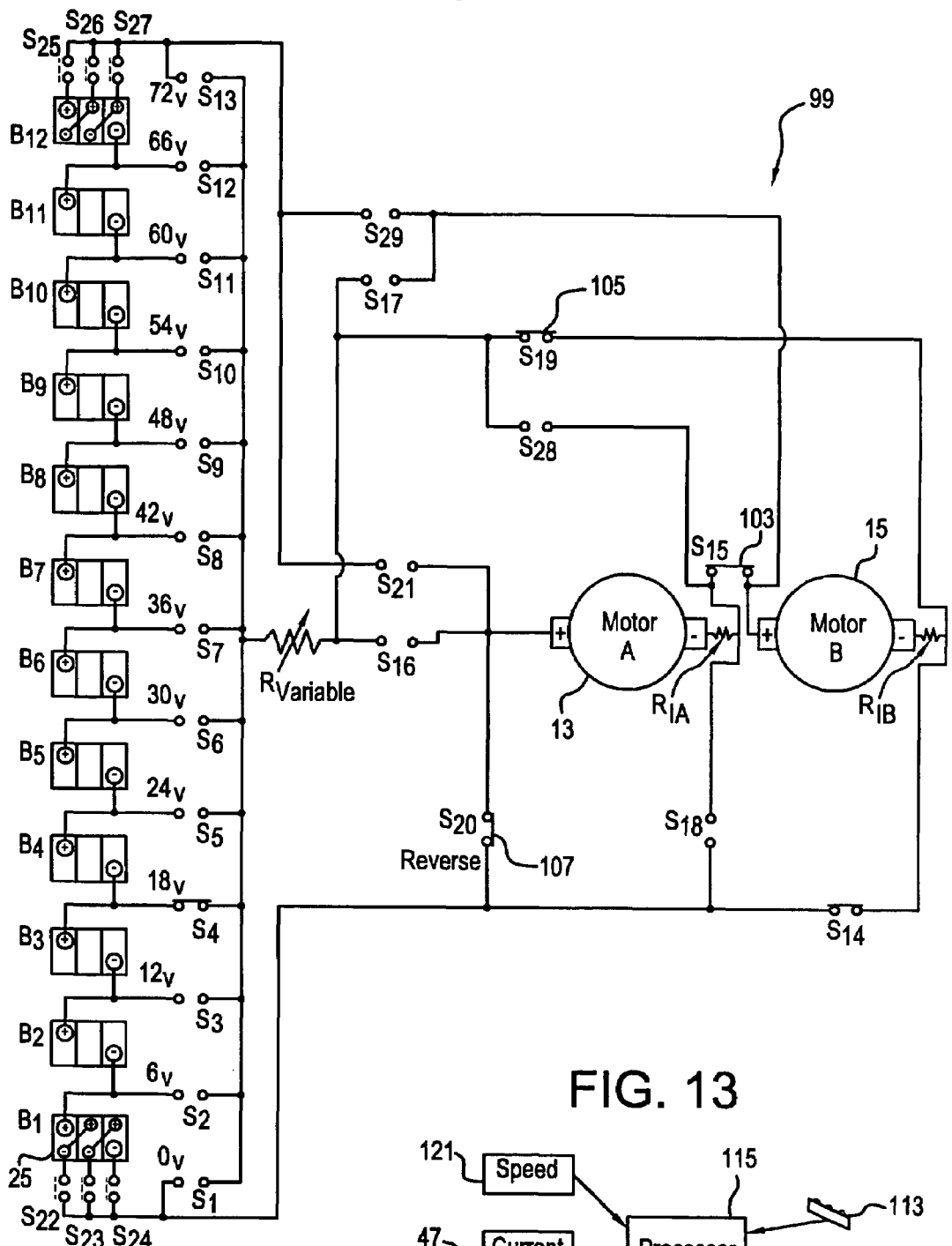
FIG. 11 is a schematic representation of the circuit for reverse operation of the motors. Reverse only uses series motor configuration for maximum torque and limiting maximum speed.

FIG. 11 is a schematic of a circuit 99 in reverse. Only series connection of motors 13, 15 is used in reverse to limit speed. Using switch $S_4$ provides 18 volts typical reverse speeds are approximately 7½M.P.H. Switches $S_{19}$ and $S_{20}$ 105, 107 are shorted to provide reverse operation. Switch $S_{15}$ 103 is closed to connect the motors in series.

FIG. 12 is a graph of an example showing sequences of switch operations. In the operation of the electric powered vehicle as shown in FIG. 12, all of the switches are open when the vehicle is stopped. When starting, switch $S_{15}$ is closed for series motor operation, and $S_{14}$ and $S_{16}$ are closed for forward operation using first the lower batteries. Those switches retain their closed status until opened intentionally. Then switch $S_2$ is shorted and is replaced by a rectifier diode. Then $S_3$ is closed and $S_2$ is opened, and the switches $S_3$ to $S_{13}$ successively opened, closed and opened in overlapping conditions using the rectifiers.

After applying the full 72 volts from switch $S_{13}$ to the motors in series, switch $S_{13}$ is opened. Rectifiers are inserted across switches $S_{15}$, $S_{17}$ and $S_{18}$. Series connection switch $S_{15}$ is opened, and parallel connection switches $S_{17}$ and $S_{18}$ are closed concurrently. Switch $S_8$ is closed applying 42 volts to the motors in parallel. As shown in FIG. 2 the forward diodes (D2, FIG. 2) remain engaged as switches 15, 17 and 18 are opened and shorted to provide smooth transition. To further accelerate, switch $S_8$ is replaced by a diode and opened and switch $S_9$ is closed for applying 48 volts to the parallel motors. Subsequently switch $S_9$ is opened and switch $S_{10}$ is closed, applying 54 volts to each of the parallel connected motors.

When accelerating the relays 31 of the switches $S_2$–$S_{13}$ are energized and contactors 32 are closed while the next switch is closed or shorted to smoothly provide the current to the motors.

The shorted condition referred to in FIG. 12 refers to the energizing of both relays 31 and 33 and the closing of both contactors 32 and 34 in the relevant switch as shown in FIG. 2. The diodes referred to in the accelerating section of FIG. 12 are the forward diodes $D_2$ which remain operational after the relays 33 are de-energized and contactors 34 are opened. The individual diodes $D_2$ remain connected as the next switch is shorted by energizing relays 31 and 33. After full current flows from the shorted switch the immediately preceding diode is deactivated by de-energizing relay 31, opening contactor 32 and thereby placing that switch in open condition.

When decelerating as shown on the chart, the motor/generators remain connected in parallel to the battery bank. The switches are operated in the manner described in FIG. 2 to connect diodes for flowing current from the motor/generators of the batteries.

First the directional diode in switch $S_{10}$ is left connected. Then the diode of switch $S_9$ is engaged and switch $S_{10}$ is opened. That is followed by sequentially connecting diodes of switches $S_8$–$S_2$ and opening switches $S_9$–$S_2$ until the vehicle stops. Then all switches are opened. The decelerating uses only the diodes $D_1$ as shown in FIG. 2 with relations 33 energized and then de-energized and contactors 34 closed and then opened. Relays 31 remain de-energized and contactors 32 remain opened throughout deceleration.

In all cases in each switch the relays, contactors and diodes shown schematically can be replaced by solid state switches and particularly by paired solid state directional switches such as the MOSFETS shown in FIG. 3.

Control of the switches is schematically indicated in FIG. 13. An accelerator pedal 111 or a speed control switch 113 typically mounted on a steering wheel provide inputs to a processor 115 which separately controls relays 31 and 33 in each individual switch $S_1$–$S_n$. Deceleration is controlled by inputs from a brake pedal 117. Initially deceleration sequencing of switches is controlled by the processor according to force on the brake pedal 117. Deceleration switch sequencing may precede actuation of a hydraulic brake pump 119 or the two may be concurrent according to force on the brake pedal or lever. The processor sequences the switches $S_2$–$S_{13}$ during accelerations and decelerations. The delayed openings of the forward directed driving or rearward directed charging diodes may be time controlled. Preferably the delayed opening of the diodes are controlled by motor current sensor 47 and vehicle speed sensor 121 sensing current through the motors and providing information signals to the processor.

While the invention has been described with reference to specific embodiments, modifications and variations of the invention may be constructed without departing from the scope of the invention.

The invention claimed is:

1. An electric vehicle motor and control system comprising:
   a vehicle, wheels connected to the vehicle, multiple permanent magnet motor/generators grouped together and drivingly connected to the wheels,
   electrical circuits connected to the motor/generators,
   batteries connected in series,
   sequentially selectable switches connected between the batteries and the circuits,
   directional current controllers connected to the switches and to the circuits for reducing transients of switching,
   series/parallel motor/generator switches in the circuits,
   wherein the motor/generators are connected in series for increased torque at low speeds and are switched to a parallel configuration for maximum speed as speed increases.

2. The system of claim 1, further comprising a differential and a drive shaft connected between the grouped-together permanent magnet motor/generators and the wheels.

3. The system of claim 1, wherein the sequentially selectable switches and the directional current controllers reduce transients to only one battery voltage value.

4. The system of claim 1, wherein in deceleration and regeneration the sequentially selectable switches are performed by the same step method control for reducing transients of switching.

5. The system of claim 1, further comprising battery bank connection switches for selecting among top and bottom series of the batteries for equalizing battery drain and usage.

6. The system of claim 1, further comprising a current sensor connected to the motor/generators and a processor connected to the current sensor, and wherein the sequentially selectable switches and directional current controllers are connected to the processor for controlling current in the circuits between the motor/generators and the batteries according to set points dependent on operator input.

7. The system of claim 6, further comprising a series variable resistor for inter step Vernier control.

8. The system of claim 6, further comprising a foot pedal, a speed control and a brake connected to the vehicle and to the processor and wherein operator input is supplied by the foot pedal, the speed control and the brake.

9. The system of claim 1, further comprising a speed sensor for determining regeneration intensity or current.

10. The system of claim 1, further comprising a brake pedal wherein regeneration intensity or current is determined by pressure on the brake pedal prior to hydraulic action.

11. The system of claim 1, further comprising a pedal for controlling regeneration level or current by a separate operator action on the pedal.

12. An electric vehicle motor and control method comprising:
   providing a vehicle, providing wheels mounted on the vehicle,
   providing permanent magnet motor/generators connected together and to the wheels,
   providing electrical circuits connected to the motor/generator,
   providing multiple batteries connected in series,
   providing switches between the batteries,
   selectively connecting the batteries to the circuits,
   connecting the motor/generators in series to the circuits,
   opening all of the switches between the batteries and the circuits,
   selectively connecting the one or more of the batteries to the circuits and to the motor/generators,
   accelerating the vehicle by closing subsequent sequential switches and maintaining directional connection of preceding switches until the subsequent switches fully pass current to the circuits,
   repeating steps from accelerating until all batteries are used during acceleration or a user indicates that acceleration should stop, opening the series connection of the motor/generators and connecting the motor/generators in parallel to the circuits.

13. The method of claim 12, further comprising providing a processor on the vehicle, connecting the processor to the switches and controlling the switches with the processor.

14. The method of claim 13, further comprising providing each of the switches with directional connections between the circuits control unit for reducing transients to only one battery voltage value.

15. The method of claim 14, further comprising controlling battery steps with a processor monitoring current and controlling battery connections set points dependent on operator input.

16. The method of claim 14, further comprising regenerating with the battery with stepped battery connection.

17. The method of claim 12, further comprising providing top and bottom battery series switching for equalizing battery drain.

18. The method of claim 17, further comprising providing operator input via a foot pedal or variable element.

19. The method of claim 18, further comprising providing a speed sensor connected to the processor for controlling battery switching.

20. The method of claim 19, further comprising controlling current while hydraulic action is active with the processor.

21. The method of claim 12, further comprising providing a brake pedal wherein regeneration current is determined by pressure on the brake pedal prior to hydraulic action.

22. The method of claim 12, further comprising providing a pedal for controlling regeneration or current by a separate operator action on the pedal.

23. The method of claim 12, further comprising affecting a Vernier speed control between steps with a series resistor, variable under process or current control.

24. The method of claim 23, further comprising utilizing heat of dissipation for heating and defrosting.

25. The method of claim 12, further comprising affecting a Vernier speed control between steps with a series DC to DC converter acting as a shunt load of zero to six volts, processor or current control.

26. The method of claim 25, further comprising providing a DC to DC converter acting as a series load converting less than six volts and current to a lesser current of higher voltage to convert some dissipated power to provide minor charging current to the battery string when in Vernier control between exact battery steps.

27. The method of claim 12, further comprising utilizing batteries with taps for each cell for smaller battery steps, wherein at least one tapped battery is in the active battery string.

28. A vehicle electric drive system comprising a vehicle, wheels connected to the vehicle for supporting, moving and directing the vehicle, an electrical power source connected to the vehicle, multiple permanent magnet motor/regenerators mounted in the vehicle and connected to the wheels for moving the vehicle, wherein the power source further comprises a battery bank having multiple batteries and multiple step switches for selectively connecting multiple selected batteries of the battery bank to the power circuit, the step switches further comprising rectifiers connected between the batteries in the battery bank and the power circuit for continuing to provide power to the power circuit while a next step of the step switches closes to provide voltage change applied to the power circuit while reducing voltage change transients of switching to only one battery voltage value.

29. The system of claim 28 wherein the step switches further comprise paired contacts for opening one of the contactors and providing current flow through one of the paired rectifiers, and the rectifiers further comprise paired opposite rectifiers for reducing regeneration transients to only one battery voltage level.

30. The system of claim 29 further comprising a battery bank selecting switch connecting different parts of the battery bank to the motor/regenerators for equalizing battery use.

31. The system of claim 29 further comprising switch controllers mounted on the vehicle and connected to the switches and operator controls connected to the switch controllers for inputting desired vehicle speed acceleration and deceleration to the switch controllers.

32. The system of claim 31 further comprising hydraulic vehicle brakes mounted on the vehicle and a speed sensor mounted on the vehicle and connected to the switch controllers for sensing vehicle speed and initiating regeneration before application of the hydraulic vehicle brakes in response to an operators brake actuation.

33. The system of claim 32 an operator input device mounted in the vehicle and connected to the switch controllers for initiating and controlling level of regeneration.

\* \* \* \* \*